Walter Schneider
Ernst Fischer
INVENTOR

Karl F. Ross
AGENT

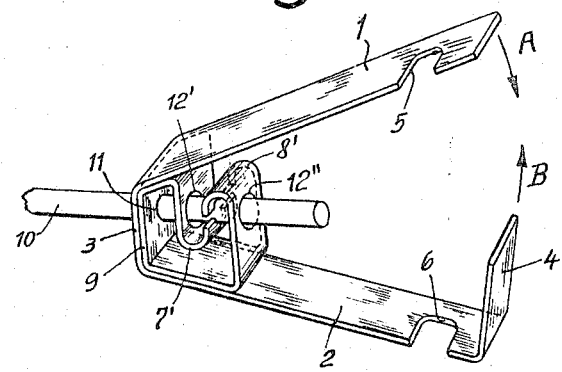
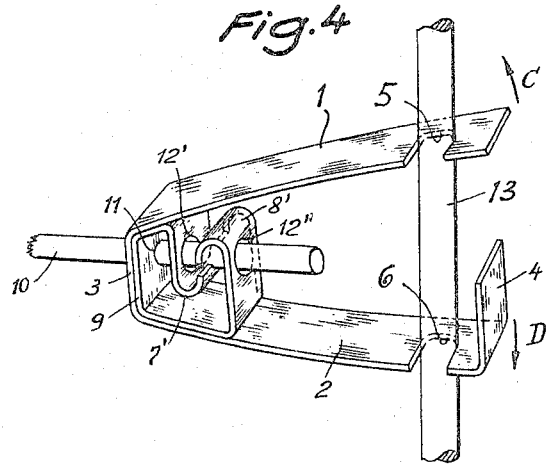

3,295,812
FASTENING CLAMP
Walter Schneider, Alte Dorfstrasse 4, Langnau, Zurich, Switzerland, and Ernst Fischer, Krauchtalstrasse 14, Bolligen, Bern, Switzerland
Filed Dec. 21, 1964, Ser. No. 419,848
Claims priority, application Switzerland, Dec. 2, 1964, 15,574/64
7 Claims. (Cl. 248—229)

In chemical laboratories, use is frequently made of fastening elements which are designed as sleeves or claws with set screws, e.g. for fastening clip connectors, rings and other parts serving for mounting appliances, for instance, on stands. However, such sleeves are often very awkward to manipulate. In addition, their manufacture from stainless material involves a good deal of work. Moreover, the commercially available sleeves of this type are heavy, bulky and comparatively expensive, especially if of stainless material.

Now the present invention relates to a fastening clamp, especially for detachably fastening connector clips fitted with a pin or the like, rings and other equipment-holding elements on stands or the like. Such clamps have two resilient legs interconnected at one end, each of these legs being provided with at least one opening or recess to fit on the pillar of the stand; the resilient clamp legs, in the unstressed state, are non-parallel to each other at least in the region of said holes or recesses, the width of said holes measured in the plane of the legs being slightly larger, but measured in the vertical projection smaller, than the diameter or thickness of the stand, and finally a bore is provided in the web interconnecting the two clamp legs to take and guide a holding pin.

In prior-art fastening clamps of the type, inserts or sleeve-like projections are arranged in the apex of the clamp legs or on the web interconnecting the two legs and these are provided with bores for taking the holding pin. The latter is fixed in the desired position by means of a set screw. In such clamps two different manipulations are needed for fitting the clamps legs to the stand and for fixing the holding pin.

The instant invention has for its object to enable the legs to be fixed to the stand and the holding pin to be locked in place with a single manipulation. This is rendered possible according to the invention in that provision is made of two clamping bodies at a distance from the web for additionally guiding and fixing the holding pin between the clamp legs, said clamping bodies coming up against the holding pin from two opposite sides, under pressure or tension, when the clamp legs are in the tensioned position, i.e. when they are fitted on the stand.

The accompanying drawing illustrates by way of example some embodiments of the object of the invention. In this drawing:

FIG. 3 shows a second embodiment of the fastening clamp in its unstressed state;

FIG. 4 shows the same clamp as tensioned and fitted to a stand;

Figure 1:
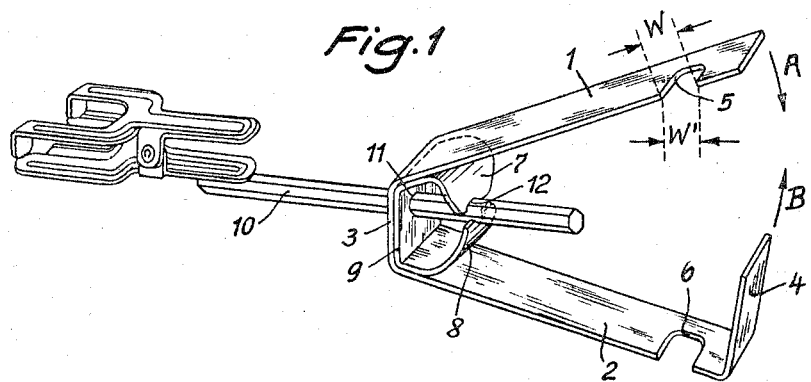
FIG. 1 is a diagrammatic representation of a first embodiment of the clamp in its unstressed state.
Figure 2:
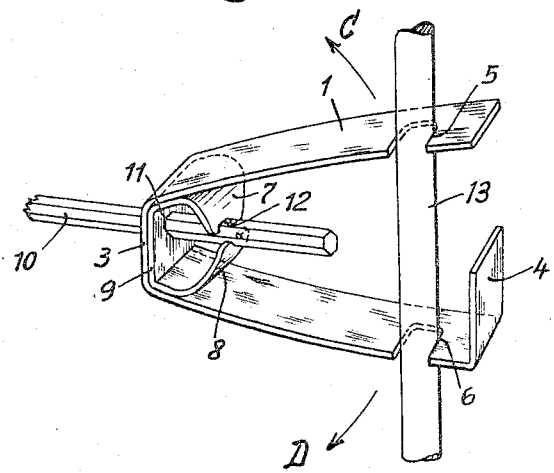
FIG. 2 shows the same fastening clamp in its tensioned state with the clamp legs fitted to a stand.

In FIGS. 1 and 2, numerals 1 and 2 designate the two resilient legs of the fastening clamp, which at one end are interconnected by a web 3 or are integral therewith, in the case shown being made of a piece of steel strip. At its free end the clamp leg 2 is bent up to form a flange 4. This flange serves as an abutment when the two clamp legs 1 and 2 are pressed together. The height of the flange corresponds roughly to the height of the web 3, so that, when the clamp leg 1 abuts against flange 4, the two legs 1 and 2 lie substantially parallel to each other. Numerals 5 and 6 denote recesses which are made near the ends of the legs 1 and 2 from one side thereof. The two legs 1 and 2 have two clamping jaws 7 and 8 arranged between them, which are interconnected by a web 9 and are integral therewith. Web 9 is preferably spot welded to web 3 or otherwise connected therewith. 10 designates the pin of, say, a burette, clamp or crucible holder, which passes through the two webs 3 and 9 and the clamping jaws 7, 8 via bores 11 and 12 respectively.

FIG. 1 shows the fastening clamp in its unstressed state. The pin 10 may be displaced and turned between the jaws 7, 8, for instance with a sliding fit.

If it is required to fit the clamp on stand 13 visible in FIG. 2, the two clamp legs 1, 2 are moved towards each other or compressed in the sense of the arrows A and B indicated in FIG. 1 until leg 1 abuts on flange 4 of leg 2. In this position the clamp legs are pushed onto stand 13 at the location of the recesses 5 and 6. If the pressure exerted by the fingers upon clamp legs 1 and 2 is then reduced, the legs 1 and 2 spring apart in the direction of the arrows C and D, whereby the width W of the recesses 5, 6 is reduced in the vertical projection to the width W'. As soon as this width W' has lessened to the diameter or the thickness of stand 13, the opening movement of legs 1, 2 is interrupted and the flanks or edges of recesses 5, 6 engage stand 13 friction-tight and are pressed onto the stand under the action of the spring force of clamp legs 1 and 2. Since the clamp legs 1, 2 fitted to stand 13 are still in a tensioned position, the two clamp jaws 7 and 8 also engage the holding pin 10 with a certain pressure, thus holding the same friction-tight.

In the second embodiment according to FIGS. 3 and 4, numerals 1 and 2 again designate the two interconnected resilient legs of the clamp with the flange 4 and the recesses 5 and 6. Numeral 10 denotes the holding pin passing through the bore 11 of the web, and 13 is the stand. 7' and 8' denote the two clamp jaws which in the present case are hook-shaped and adapted to engage the holding pin 10 from opposite sides with respect to the embodiment according to FIGS. 1 and 2. The two hooks 7' and 8' are interconnected by a web 9 and consist of a piece of spring strip steel integral therewith. In order not to hinder flexure or obstruct the spring path of the hooks 7', 8', the holding pin passes through the vertical webs thereof in suitably large bores 12' and 12" respectively allowing adequate clearance.

FIG. 3 shows the legs 1, 2 of the clamp in its unstressed state, but with the two jaws or hooks 7', 8' engaging the holding pin at maximum pressure or tension, and thus holding it friction-tight. For fitting the clamp to stand 13 (FIG. 4), the two legs 1, 2 are again pressed towards each other in the sense of the arrows A and B indicated in FIG. 3, until the free end of leg 1 comes up against flange 4. In this tensioned position of the clamp, in which the legs can be pushed upon stand 13 with their recesses 5 and 6, jaws 7', 8' have moved apart so far as to permit holding pin 10 to be turned or moved to and fro. When finger pressure on the ends of the legs 1, 2 is reduced, the legs spring apart in the direction of arrows C and D in FIG. 4 until the flanks of the recesses 5, 6 engage the stand 13 by clamping, as shown in FIG. 4. The force and flexure of the spring formed by hooks 7' and 8' and web 9 is so attuned to the force and flexure of the spring defined by clamp legs 1, 2 and web 3 that the holding pin 10 introduced between hooks 7' and 8' is only wholly relieved of pressure or tension when the legs 1, 2 are compressed or moved towards each other so far as to lie substantially parallel to each other.

This form has the advantage that the frictional engagement between hooks 7', 8' and the holding pin 10 can be nullified merely by compressing the clamp legs, without the clamp having to be removed from the stand. Another advantage of this embodiment consists in that the holding pin is held friction-tight even with the clamp legs wholly relieved or when the clamp is removed from the stand, so that it cannot fall out.

Figure 5:
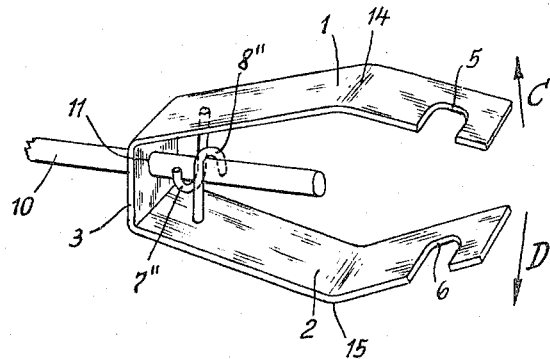
FIG. 5 shows the fastening clamp according to a third embodiment in its unstressed state.
Figure 6:
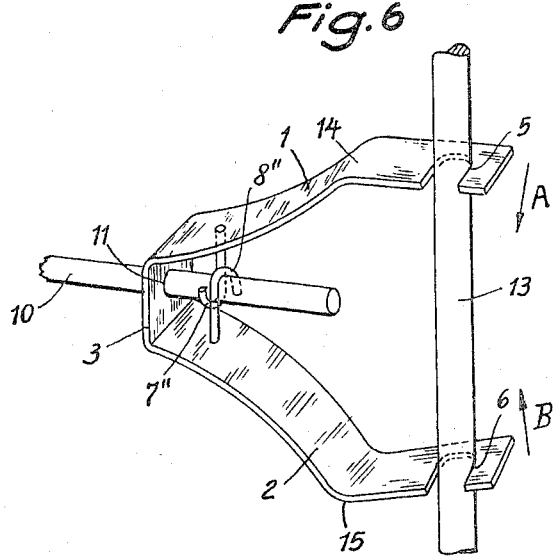
FIG. 6 shows the same clamp fixed to a stand, in its tensioned state.

In the embodiment according to FIGS. 5 and 6, numerals 1 and 2 again designate the clamp legs, 3 the web interconnecting them, with the bore for the holding pin 10; 5 and 6 are the recesses for fitting on the stand 13, and 7" and 8" are the two clamping bodies, again hook-shaped and anchored in legs 1, 2 so as to embrace the holding pin from opposite sides.

In contrast to the embodiment according to FIGS. 1–4, in which the unstressed clamp legs are divergent from web 3 onwards, in the form according to FIGS. 5 and 6 the unstressed legs 1, 2 are divergent from web 3 only initially, viz., up to the apices 14 and 15, after which they are convergent towards their ends.

In this clamp the two hooks 7", 8" are in such a relative position when the legs are unstressed (FIG. 5) that holding pin 10 can easily be moved to and fro or turned. In fitting of the clamp to stand 13, the clamp legs must be moved apart in the direction of the arrows C and D until the converging ends of the legs (FIG. 5) are substantially parallel to each other, whereupon the legs can be pushed upon stand 13 with the recesses 5 and 6. If the finger pressure acting in the direction of the arrows C and D is now reduced, clamp legs 1 and 2 again spring towards each other in the sense of the arrows A and B in FIG. 6 until the edges of the recesses 5, 6 grip the stand, whereby the legs engage the stand friction-tight. In this tensioned position of the clamp legs hooks 7" and 8" are also drawn with corresponding pressure or tension against holding pin 10 so as to hold the same friction-tight.

The form and design of the openings in the clamp legs fitting on the stand or the like depend on the cross-section of the stand pillar, and also on whether the clamp is to be merely displaceable on the stand or removable therefrom. In the first case, instead of the slot-like recesses open at one side as shown, bores may be provided to fit on the stand with clearance. In the event that the clamp legs are not provided with bores, but with slots open at one side as shown for fitting on a stand of circular cross-section, it is preferable to have these slots somewhat enlarged towards the inside in order to prevent unintentional slipping from the stand during turning movements of the clamp about it. Such unintentional turning movements may also be prevented by choosing for the stand or the like a polygonal profile, for instance a square cross-section. In this case the fastening clamp ensures a perfectly firm fit in spite of forces acting in any direction.

What we claim is:

It will be observed that, in each of the three disclosed embodiments, the device according to our invention comprises a body whose legs 1, 2 are resiliently biased into a first position (FIGS. 1, 3 and 5) of relative inclination of their extremities, the latter being substantially parallel in a second position in which their cutouts 5, 6 are engageable by the transverse rod 13 of smaller cross-section. FIGS. 2, 4 and 6 show an intermediate position in which the rod 13 is firmly clamped by the edges of the cutouts while a pair of retaining members 7, 7', 7" and 8, 8', 8" are stressed by the legs 1, 2 to engage the pin 10 extending perpendicularly to rod 13 through an aperture 11 of the clamped body at the junction of these legs. It will also be noted that, in the embodiments of FIGS. 1–4, the retaining members 7, 8 and 7', 8', referred to above as jaws, have substantially the width of the associated legs 1, 2, these jaws being generally J-shaped in the case of FIGS. 3 and 4. Whereas the hooks 7", 8" of FIGS. 5 and 6 can also be described as J-shaped, the effect of their overlapping ends upon the pin 10 differs from that of the jaws 7', 8' in that the latter release the pin in the parallel position of the slotted extremities whereas the hooks 7", 8" do so in the position of FIG. 5 in which the extremities converge.

What we claim is:

1. A fastening device comprising a body having a pair of interconnected legs with free extremities remote from their junction, said legs being resiliently biased into a first position of relative inclination of said extremities and being manually movable against their biasing force into a second position in which said extremities are substantially parallel to each other, said extremities being formed with registering cutouts which are engageable in said second position by a transverse rod of smaller cross-section and whose edges firmly clamp said rod onto said body upon return of said legs toward said first position by said biasing force, said body being apertured at said junction for penetration by a pan perpendicular to said rod; and a pair of retaining members respectively secured to said legs in the vicinity of said junction for co-operation with each other in engaging said pin, said members being held by said legs under pin-engaging stress in at least an intermediate position in which said rod is held clamped by said edges.

2. A device as defined in claim 1 wherein said members are a pair of jaws having substantially the width of said legs.

3. A device as defined in claim 2 wherein said jaws are arranged to bear under pressure upon said pin in both said intermediate and second positions but not in said first position.

4. A device as defined in claim 2 wherein said jaws are generally J-shaped with bent-over ends confronting each other across said pin, the main portions of said jaws being slotted for free penetration by said pin whereby said ends exert pressure upon said pin in said intermediate and first positions but not in said second position.

5. A device as defined in claim 1 wherein said members are a pair of relatively inverted hooks with overlapping ends adapted to engage said pin.

6. A device as defined in claim 1 wherein said legs have divergent portions extending outwardly from said junction and forming a bend on joining said extremities, the latter converging toward each other in said first position and being movable into said second position by a further spreading of said divergent portions.

7. A device as defined in claim 1 wherein said extremities diverge in said first position, one of said extremities having a bent-over extension forming a stop for the other extremity in said second position.

References Cited by the Examiner
UNITED STATES PATENTS

| | | | |
|---|---|---|---|
| 1,505,220 | 8/1924 | Shay | 24—243 |
| 2,216,886 | 10/1940 | Langelier | 248—311 |
| 2,487,490 | 11/1949 | Sterrett | 137—104 |
| 3,154,276 | 10/1964 | Havener | 248—73 |

CLAUDE A. LE ROY, *Primary Examiner.*

R. P. SEITTER, *Assistant Examiner.*